(No Model.) 2 Sheets—Sheet 1.
G. LINDENTHAL.
ARCH BRIDGE.
No. 311,338. Patented Jan. 27, 1885.
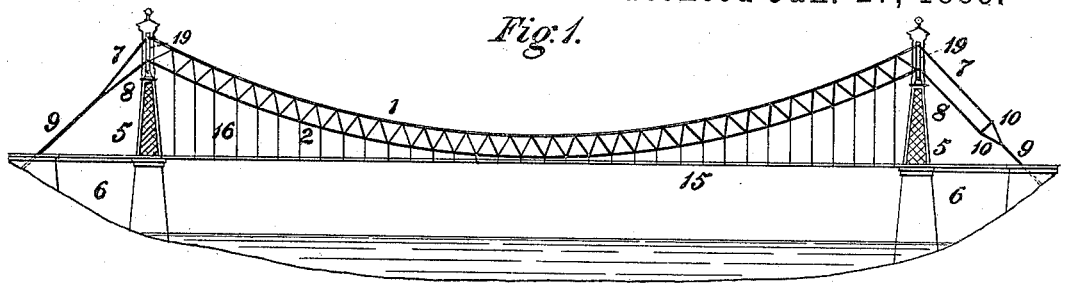
Fig. 1.
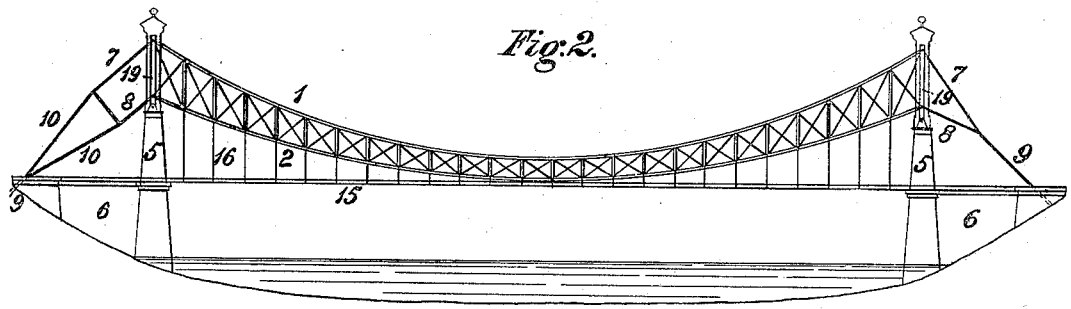
Fig. 2.
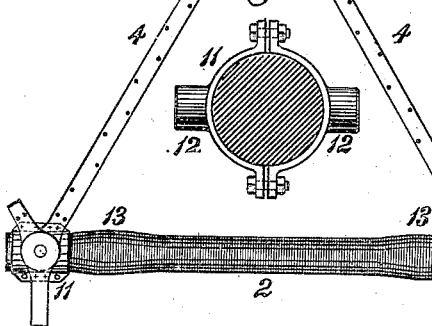
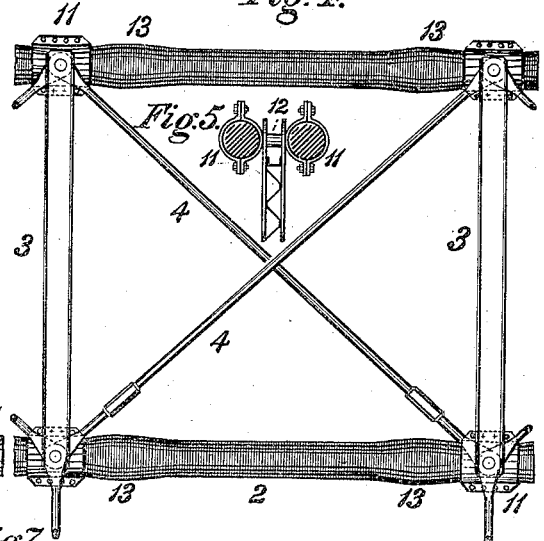
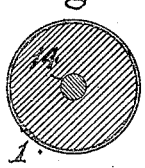
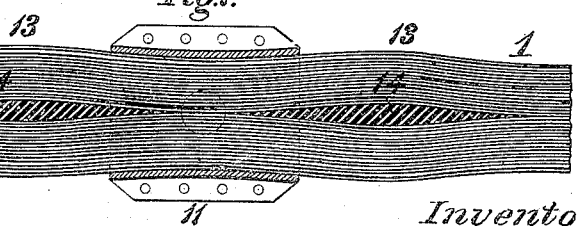
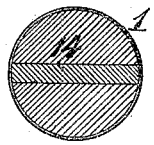
Witnesses.
J. Snowden Bell
C. M. Clarke
Inventor.
G. Lindenthal
by George H. Christy
Atty.

(No Model.) 2 Sheets—Sheet 2.

G. LINDENTHAL.
ARCH BRIDGE.

No. 311,338. Patented Jan. 27, 1885.

Witnesses: Inventor: G. Lindenthal
By Attorney, George H. Christy

UNITED STATES PATENT OFFICE.

GUSTAV LINDENTHAL, OF PITTSBURG, PENNSYLVANIA.

ARCH-BRIDGE.

SPECIFICATION forming part of Letters Patent No. 311,338, dated January 27, 1885.

Application filed August 18, 1884. (No model.)

*To all whom it may concern:*

Be it known that I, GUSTAV LINDENTHAL, a citizen of the United States, residing at Pittsburg, in the county of Allegheny and State of Pennsylvania, have invented or discovered certain new and useful Improvements in Arch-Bridges, of which improvements the following is a specification.

Figure 10:
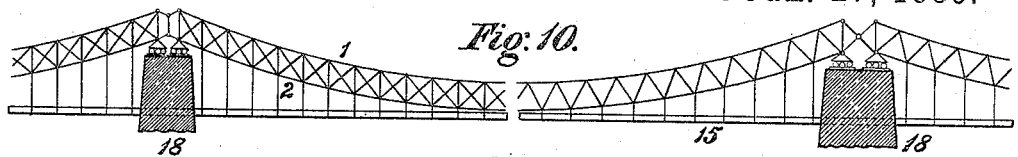
Figures 11, 17:
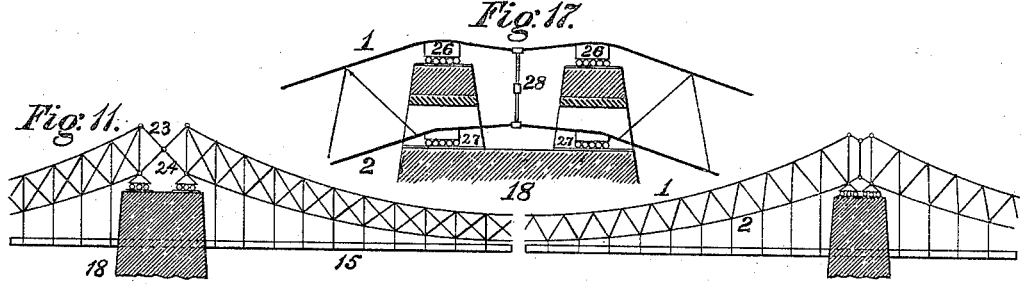
Figure 12:
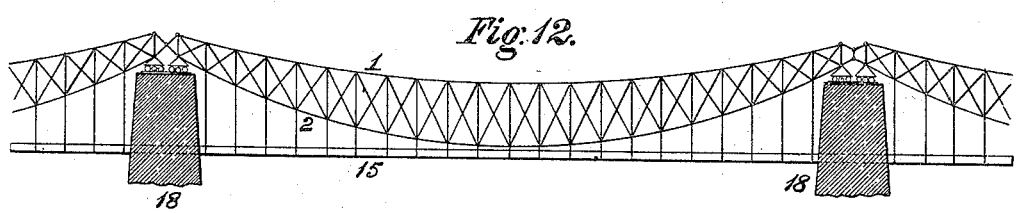
Figure 13:
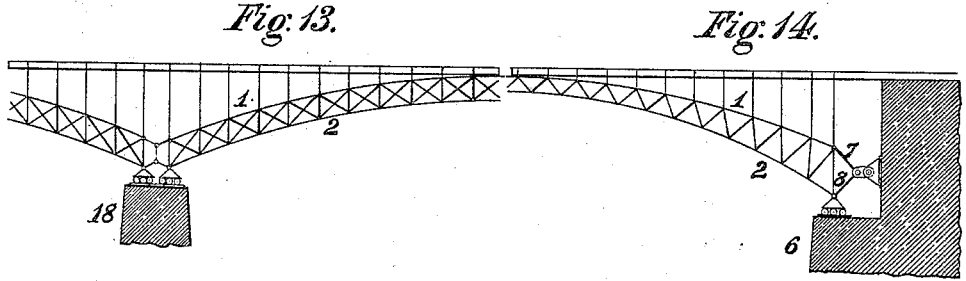
Figure 14:
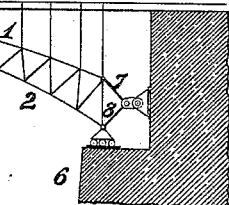

In the accompanying drawings, which make part of this specification, Figures 1 and 2, Sheet 1, are diagrammatic views of single-span suspension-bridges illustrating applications of my invention; Figs. 3 to 9, inclusive, detailed views on an enlarged scale, illustrating the brace-connections of the cables; Figs. 10 to 12, inclusive, Sheet 2, diagrammatic views of suspension-bridges of more than one span, illustrating applications of my invention; Figs. 13 and 14, similar views of compression-arch bridges with my improvements applied; and Figs. 15 to 17, detailed views on an enlarged scale, showing the balancing mechanism of the arch members.

My invention relates to arch-bridges of the class in which two or more separate and independent braced arch members are employed to support each side of the platform or roadway, and comprehends both arches which are erected in compression and those which are inverted or suspended in tension.

The objects of my invention are to provide separate bearings on the piers or abutments for the single members of double-braced arches, and to so connect and balance the ends of the arches upon their piers or abutments that imposed loads shall be divided equally between the two members of each double arch.

The improvements claimed are hereinafter fully set forth.

Referring first to Figs. 1 to 9, inclusive, in which my improvements are shown as applied in single-span suspension-bridges, the arch is composed of two separate cables, 1 2, which may be either wire or link cables, located one above the other, and connected by an intermediate system of bracing composed of struts 3 and diagonal ties 4, or of diagonal braces 4 only. Each of the cables or arch members is connected independently of the other to rocking posts 19, resting on pivot-pins on end towers or supports, 5, on the abutments 6, and the rocking posts 19 are connected by separate balancing-ties 7 8 with anchor-ties 9, secured in suitable anchorages. The connecting-ties 7 8 may be either parallel and secured by intermediate converging ties, 10, to the anchor-ties 9, as shown on the right of Fig. 1 and left of Fig. 2, or they may converge and be united directly to the anchor-ties, as shown on the left of Fig. 1 and the right of Fig. 2.

In order to prevent the longitudinal displacement of the brace-connections of the cables, the sockets 11, which carry the pins 12, to which the bracing members 4 5 are coupled, are secured upon the cables between swells or enlargements 13, formed by the insertion of spreading-pieces 14 in the cables on each side of the seats of the several sockets, as shown in Figs. 7 to 9. The roadway or platform 15 is supported by ties or suspenders 16 in the ordinary manner. The system is equally applicable in connection with cradled double cables or spreading double arches—that is to say, where two or more double arches are located in planes inclined one to the other.

Fig. 5 illustrates the connection of the bracing to pins between two adjacent arch members. Stays and stiffening-trusses may also be employed in combination with the arches, if desired, although they will not generally be found necessary for preventing deformation of braced double arches.

Under the above construction each member of the braced double arch is separately and independently supported upon the abutments or piers, and the two members are balanced and adapted to receive and sustain equal proportions of imposed load.

Figure 15:
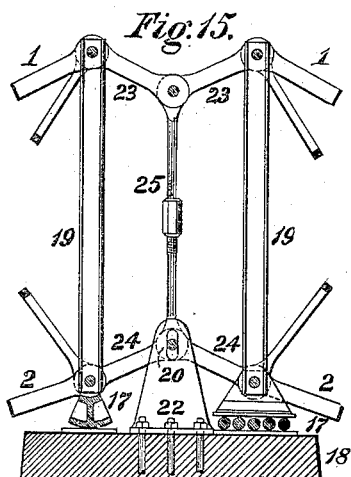
Figure 16:
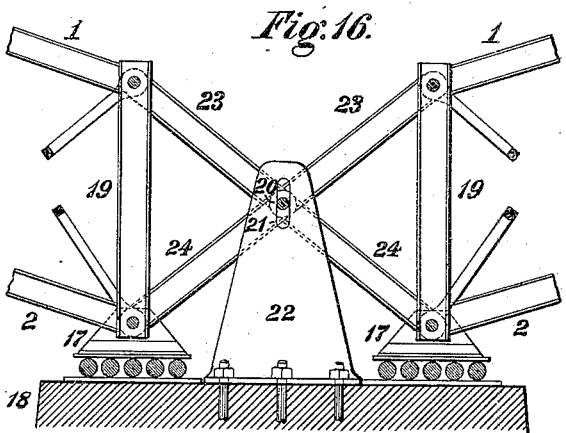

The application of my invention in arch-bridges of more than one span is shown in Figs. 10 to 17, inclusive, Figs. 10, 11, 12, and 17 showing arches suspended in tension, and Figs. 13 and 14 compression-arch. The ends of the arch members above the piers are connected and balanced by a post-and-link construction such as illustrated in Figs. 15 and 16. The lower arch members, 2, are coupled to shoes or rockers 17, through which they bear on the piers 18, and the upper arch members, 1, are coupled to the upper ends of posts 19, the lower ends of which are coupled to the rockers 17. The ends of the arches of the spans adjacent to each pier are connected by links or struts, according as the arch is in suspension or under compression, with a pin, 20, which is adapted to move vertically in a slot, 21, in a post, 22, fixed upon the pier centrally between the ends of the spans supported thereon.

In the construction shown in Fig. 15 the upper arch members, 1, are coupled by links 23 to the upper end of a vertical tie, 25, which is coupled at its lower end to the pin 20, and the lower arch members, 2, are coupled directly to said pin by links 24, while in Fig. 16 both the upper and the lower members are coupled directly to the pin 20 by struts 23 and 24, respectively.

In the construction shown in Fig. 15, when applied to an end tower, one of the rocking posts may be connected to anchor-ties 7 and 8, taking the place of the arch members 1 and 2.

In the modification shown in Fig. 17 the members of the double suspension-arches, in lieu of being attached by eyes or shoes to pins on rocking posts, as above described, are separately supported on the pier by upper and lower saddles, 26 27, having the capacity of longitudinal movement on the pier, and are drawn together between said supports by a vertical tie, 28, the upper and lower saddles in such case acting as mechanical equivalents of the rocking posts. In each instance the effect of the balancing connection of the arch members is to prevent either member of the double arch from being strained to a greater degree than the other, and to cause equal strain to be imparted to their ends—that is to say, their horizontal components on the piers will be equal, and both members will sustain simultaneously each one half of the imposed load. The tendency of the upper links or struts to straighten under excess of strain in the upper members, to which they are connected, will elevate the lower links or struts and induce a corresponding increase of strain in the lower members until both are in equilibrium.

In cases where the upper and lower arch members are parallel or have the same deflection they should be made of equal sectional areas, and where one member has a greater deflection than the other, as in Figs. 2, 11, 12, and 14, the arch strains proper and the sectional areas of the upper and lower members will, in accordance with the laws of arch construction, be in inverse ratio of the respective deflections.

The calculation of strains resulting from uniform or transient loads and from expansion and contraction at different temperatures is the same under my invention as in the case of arches hinged at the ends only; and it will be obvious that if the rocking posts or saddles were rigidly connected with each other or with an anchorage without a balancing arrangement, deflection of the arch would induce increased tension at the ends of the upper member and decreased tension or even compression at the ends of the lower, otherwise termed "end movements" of arches with fixed ends.

I am aware that braced double arches in which the hinged ends converge to and rest upon single pins on the piers have been heretofore known. Such construction, which I disclaim, differs from my invention in the essential particular of the absence of provision for the separate support of the arch members and of means for balancing strains which are afforded in structures embodying my improvements.

I claim herein as my invention—

1. In an arch-bridge, the combination of an upper and a lower arch member, bearings supporting said members separately and independently upon piers or abutments, and balancing ties or struts connecting the ends of said members with each other and with anchorages, substantially as set forth.

2. In an arch-bridge of more than one span, the combination of an upper and a lower arch member in each span, bearings supporting said members separately and independently upon the piers, and a balancing connection as described between the ends of the spans supported on the pier, substantially as set forth.

3. In an arch-bridge of one or more spans, the combination of an upper and a lower arch member, posts connected to the ends of said members and supported upon shoes or rockers on a pier, and links or struts connecting the ends of the arch members with a pin having the capacity of vertical movement, substantially as set forth.

4. In an arch-bridge of more than one span, the combination of a series of arches, each composed of separate upper and lower members, bearings supporting said members separately and independently upon one or more piers, a balancing connection as described between the ends of the spans supported on the pier or piers, bearings supporting the arch members separately and independently upon abutments, and ties or links connecting the ends of said members with each other and with anchorages, substantially as set forth.

5. In an arch-bridge as described, the combination of an upper and a lower wire cable and a system of interposed web-bracing connected to said wire cables between swells or enlargements thereon, substantially as set forth.

In testimony whereof I have hereunto set my hand.

GUSTAV LINDENTHAL.

Witnesses:
J. SNOWDEN BELL,
S. HARVEY THOMPSON.